US012620181B2

(12) United States Patent     (10) Patent No.:   US 12,620,181 B2

Kwatra et al.     (45) Date of Patent:     May 5, 2026

(54) DETERMINING AN ASSIGNMENT OF VIRTUAL OBJECTS TO POSITIONS IN A USER FIELD OF VIEW TO RENDER IN A MIXED REALITY DISPLAY

(71) Applicant: INTERNATIONAL BUSINESS MACHINES CORPORATION, Armonk, NY (US)

(72) Inventors: Shikhar Kwatra, San Jose, CA (US); Smitkumar Narotambhai Marvaniya, Bangalore (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 17/935,077

(22) Filed: Sep. 23, 2022

(65) Prior Publication Data

US 2024/0104854 A1     Mar. 28, 2024

(51) Int. Cl.
    *G06T 19/00*     (2011.01)
    *G06T 15/20*     (2011.01)

(52) U.S. Cl.
    CPC ............ *G06T 19/006* (2013.01); *G06T 15/20* (2013.01); *G06T 2215/16* (2013.01)

(58) Field of Classification Search
    CPC .... G06T 19/006; G06T 15/20; G06T 2215/16
    USPC ........................................ 345/633
    See application file for complete search history.

(56) References Cited

U.S. PATENT DOCUMENTS

| 7,564,469 | B2 | 7/2009 | Cohen |
| 2009/0061901 | A1 | 3/2009 | Arrasvuori et al. |
| 2013/0147837 | A1 | 6/2013 | Stroila |
| 2013/0278631 | A1* | 10/2013 | Border ................ G06F 3/04842 |
| | | | 345/633 |
| 2019/0087842 | A1 | 3/2019 | Koenig |
| 2019/0108686 | A1 | 4/2019 | Spivack et al. |
| 2019/0286231 | A1* | 9/2019 | Burns ..................... G06F 9/451 |

(Continued)

FOREIGN PATENT DOCUMENTS

| WO | 2019079826 A1 | 4/2019 |
| WO | 2019183593 A1 | 9/2019 |

OTHER PUBLICATIONS

Anonymous, "Advertising using augmented reality," IP.com No. IPCOM000251920D, IP.com Electronic Publication Date: Dec. 11, 2017, 7 pp.

(Continued)

*Primary Examiner* — Thomas J Lett

(74) *Attorney, Agent, or Firm* — James L. Olsen

(57)        ABSTRACT

Provided are a computer program product, system, and method for determining an assignment of virtual objects to positions in a user field of view to render in a mixed reality display. A reward score for a virtual object is calculated based on an easiness score indicating an easiness to view the virtual object in previous interactions with the virtual object and frequency of interactions with the virtual object. The reward scores and the viewability scores for the positions are inputted into a virtual object placement program to output an assignment of the virtual objects to the positions. The assignment of the virtual objects to the positions are transmitted to the mixed reality display to cause the mixed reality display to render the virtual objects at the positions in the field of view of the user indicated in the assignment.

20 Claims, 7 Drawing Sheets

(56) References Cited

U.S. PATENT DOCUMENTS

| | | | |
|---|---|---|---|
| 2020/0219319 A1 | 7/2020 | Ashmar et al. | |
| 2020/0226823 A1* | 7/2020 | Stachniak | G06T 19/006 |
| 2021/0035364 A1 | 2/2021 | Childress et al. | |
| 2021/0166270 A1 | 6/2021 | Du | |
| 2021/0390587 A1 | 12/2021 | Griffin et al. | |

OTHER PUBLICATIONS

Anonymous, "Augmented Reality Advertising at the Right Moment on the Right Surface of the Right Item," IP.com No. IPCOM000257319D, IP.com Electronic Publication Date: Jan. 31, 2019, 5 pp.

Anonymous, "Method and System for Displaying Content Using Augmented Reality," IP.com No. PCOM000217064D, IP.com Electronic Publication Date: Apr. 30, 2012, 2 pp.

IBM Corporation, "AR and VR in the workplace, Extended reality reimagines how work is done," Reference 29035129USEN-01, [online][Retrieved Sep. 23, 2022] https://www.ibm.com/thought-leadership/institute-business-value/report/ar-vr-workplace, Sep. 2020, 12 pp.

Lopez, et al., "Reinforcement learning for Procedural Content Generation of 3D Virtual Environments," Journal of Computing and Information Science in Engineering, Oct. 2020, vol. 20 pp. 051005-1 to 051005-9, 9 pp.

Nikolentos, et al., "k-hop graph neural networks," arXiv: 1907.06051v2 [stat.ML], Aug. 9, 2020, 23 pp.

"Augmented Reality in 2020—It's time to get familiar," [online][retrieved Sep. 23, 2022] https://www.troia.eu/news/id/355/augmented reality-in-2020, Jan. 13, 2020, 6 pp.

Berthiaume, D. "Analysis: How many customers will shop using augmented reality?", Chain Store Age, [online] [retrieved Sep. 23, 2022] https://chainstoreage.com/technology/analysis-how-many-customers-will-shop-using-augmented-reality, Apr. 2, 2019, 2 pp.

* cited by examiner

200

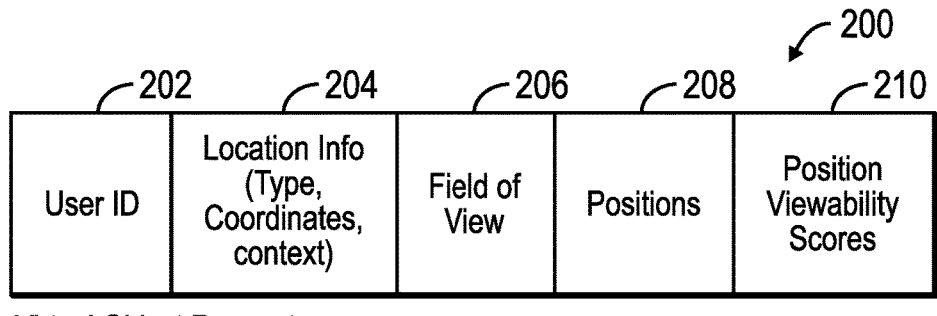

202  204  206  208  210

| User ID | Location Info (Type, Coordinates, context) | Field of View | Positions | Position Viewability Scores |
|---|---|---|---|---|

Virtual Object Request

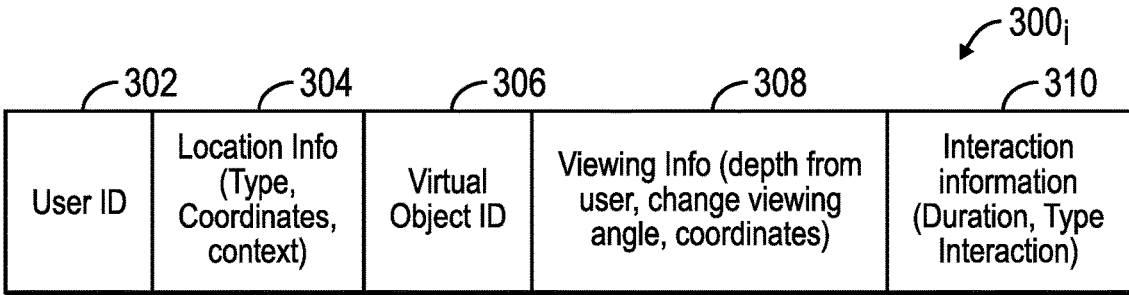

302  304  306  308  310

| User ID | Location Info (Type, Coordinates, context) | Virtual Object ID | Viewing Info (depth from user, change viewing angle, coordinates) | Interaction information (Duration, Type Interaction) |
|---|---|---|---|---|

Object View Results

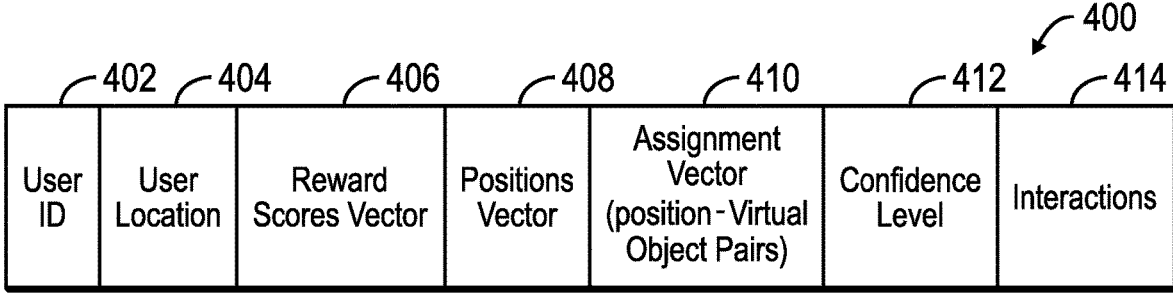

402  404  406  408  410  412  414

| User ID | User Location | Reward Scores Vector | Positions Vector | Assignment Vector (position-Virtual Object Pairs) | Confidence Level | Interactions |
|---|---|---|---|---|---|---|

Training Set Instance

FIG. 4

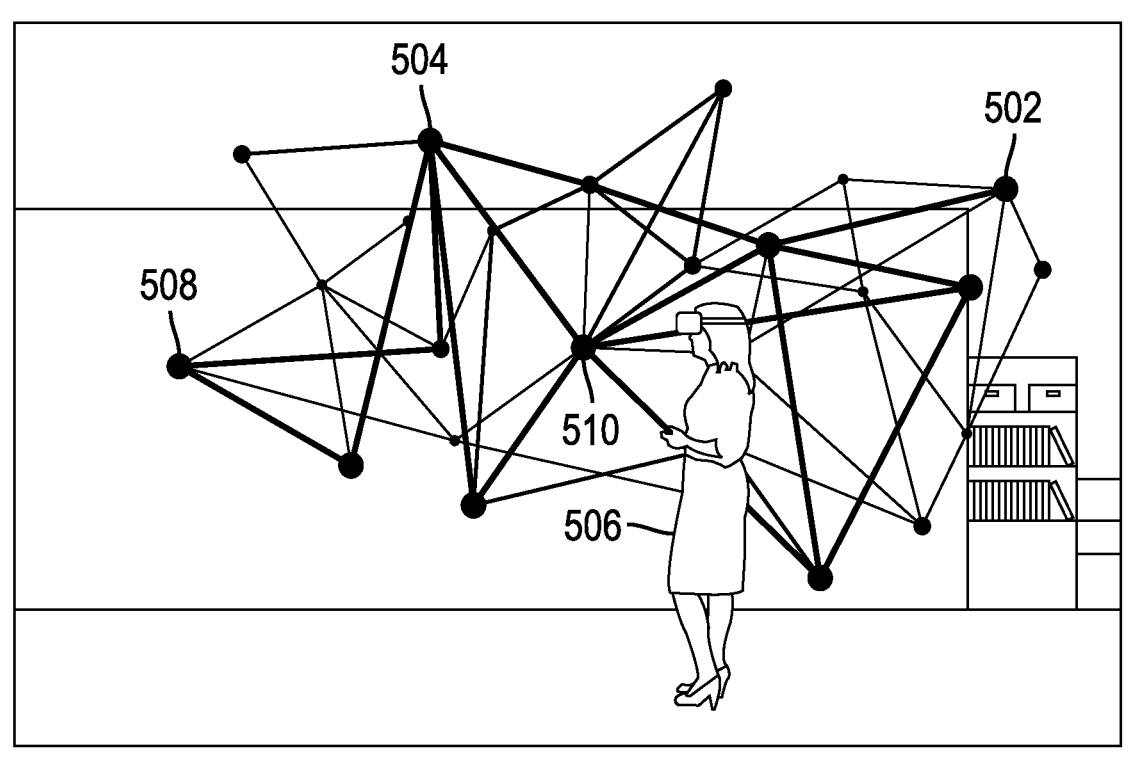
FIG. 5
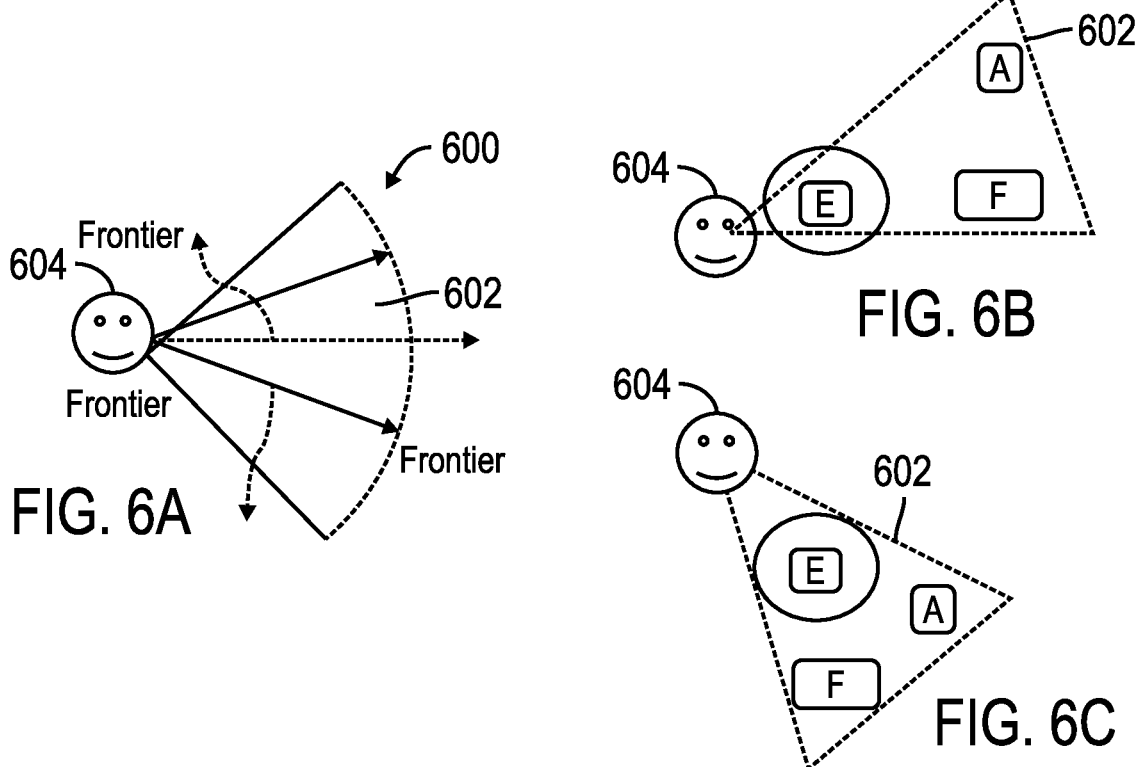
FIG. 6A
FIG. 6B
FIG. 6C

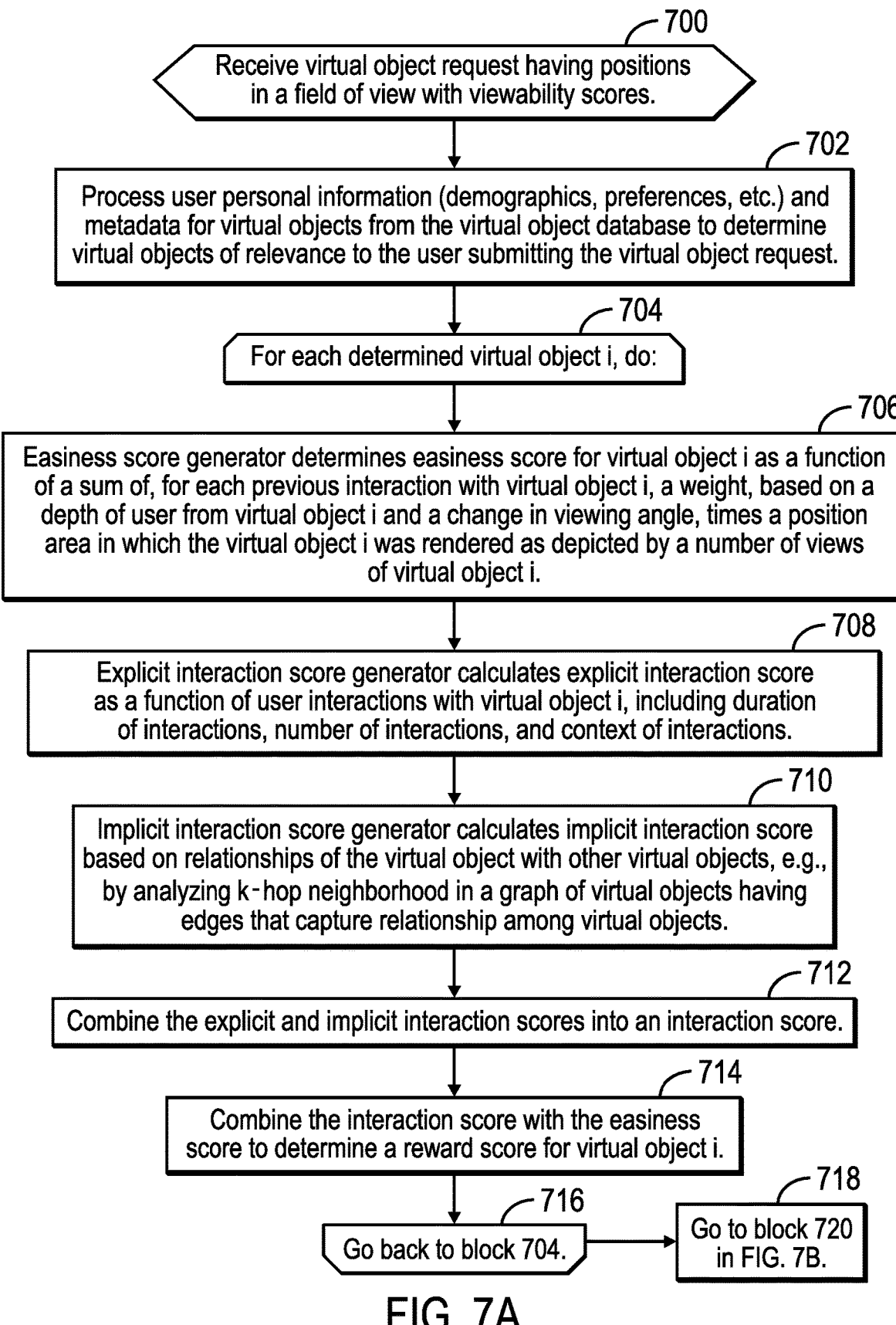

700

Receive virtual object request having positions
in a field of view with viewability scores.

702

Process user personal information (demographics, preferences, etc.) and
metadata for virtual objects from the virtual object database to determine
virtual objects of relevance to the user submitting the virtual object request.

704

For each determined virtual object i, do:

706

Easiness score generator determines easiness score for virtual object i as a function
of a sum of, for each previous interaction with virtual object i, a weight, based on a
depth of user from virtual object i and a change in viewing angle, times a position
area in which the virtual object i was rendered as depicted by a number of views
of virtual object i.

708

Explicit interaction score generator calculates explicit interaction score
as a function of user interactions with virtual object i, including duration
of interactions, number of interactions, and context of interactions.

710

Implicit interaction score generator calculates implicit interaction score
based on relationships of the virtual object with other virtual objects, e.g.,
by analyzing k-hop neighborhood in a graph of virtual objects having
edges that capture relationship among virtual objects.

712

Combine the explicit and implicit interaction scores into an interaction score.

714

Combine the interaction score with the easiness
score to determine a reward score for virtual object i.

716

Go back to block 704.

718

Go to block 720
in FIG. 7B.

FIG. 7A

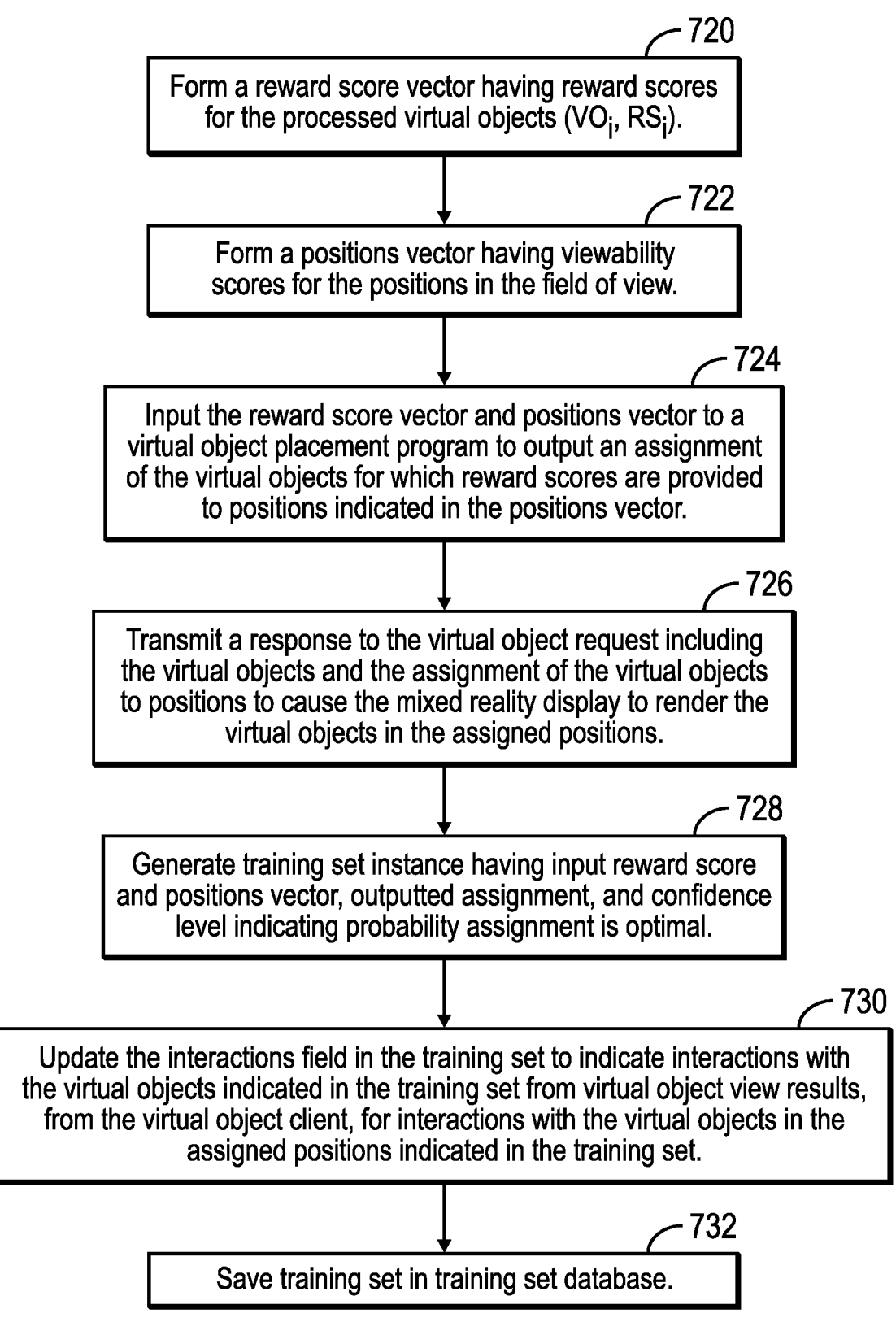

720

Form a reward score vector having reward scores
for the processed virtual objects (VO$_i$, RS$_i$).

722

Form a positions vector having viewability
scores for the positions in the field of view.

724

Input the reward score vector and positions vector to a
virtual object placement program to output an assignment
of the virtual objects for which reward scores are provided
to positions indicated in the positions vector.

726

Transmit a response to the virtual object request including
the virtual objects and the assignment of the virtual objects
to positions to cause the mixed reality display to render the
virtual objects in the assigned positions.

728

Generate training set instance having input reward score
and positions vector, outputted assignment, and confidence
level indicating probability assignment is optimal.

730

Update the interactions field in the training set to indicate interactions with
the virtual objects indicated in the training set from virtual object view results,
from the virtual object client, for interactions with the virtual objects in the
assigned positions indicated in the training set.

732

Save training set in training set database.

FIG. 7B

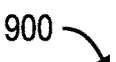
900

Computer 901

Processor Set 910

| Processing Circuitry 920 | Cache 921 |

Communication Fabric 911

Volatile Memory 912

Persistent Storage 913

Operating System 922

| Virtual Object Placement Server Components 903 | Virtual Object Placement Client Components 905 |

901

Peripheral Device Set 914

| UI Device Set 923 | Storage 924 | IoT Sensor Set 925 |

Network Module 915

WAN 902

End User Device 903

Remote Server 904

Remote Database 930

Private Cloud 906

Gateway 940

Public Cloud 905

Cloud Orchestration Module 941

Host Physical Machine Set 942

Virtual Machine Set 943

Container Set 944

FIG. 9

DETERMINING AN ASSIGNMENT OF VIRTUAL OBJECTS TO POSITIONS IN A USER FIELD OF VIEW TO RENDER IN A MIXED REALITY DISPLAY

BACKGROUND OF THE INVENTION

1. Field of the Invention

The present invention relates to a computer program product, system, and method for determining an assignment of virtual objects to positions in a user field of view to render in a mixed reality display.

2. Description of the Related Art

Mixed reality (MR) smart glasses are wearable computer-capable glasses that generate virtual objects, such as three-dimensional images, text, animations, and videos, to overlay into the wearer's field of vision to enable the wearer to view and interact with the virtual objects. Mixed reality is used to generate virtual objects in a user's field of view to enable the user to view and interact with the virtual objects. Mixed Reality (MR) merges the real world and the virtual world to create an immersive experience.

Mixed Reality is a combination of virtual reality and augmented reality. It creates a world in which more than one person can participate in an immersive environment and collaborate on a common task together. Mixed Reality glasses create visualizations where objects from both virtual world and real world interact with each other.

There is a need in the art to provide improved techniques for rendering mixed reality virtual objects in a mixed reality display to enhance user experiences.

SUMMARY

Provided are a computer program product, system, and method for determining an assignment of virtual objects to positions in a user field of view to render in a mixed reality display. Provided are viewability scores for positions in a field of view of a user in which virtual objects are rendered. A viewability score for a position is based on a distance from the user and change in viewing angle to view the position. Reward scores for virtual objects are calculated. A reward score for a virtual object is calculated based on an easiness score indicating an easiness to view the virtual object in previous interactions with the virtual object and frequency of interactions with the virtual object. The reward scores and the viewability scores for the positions are inputted into a virtual object placement program to output an assignment of the virtual objects to the positions. The assignment of the virtual objects to the positions are transmitted to the mixed reality display to cause the mixed reality display to render the virtual objects at the positions in the field of view of the user indicated in the assignment.

BRIEF DESCRIPTION OF THE DRAWINGS

FIG. 2 illustrates an embodiment of a virtual object request from a user wearing the mixed reality display.

FIG. 3 illustrates an embodiment of object view results having interaction on user interaction with virtual objects rendered in a mixed reality display.

FIG. 4 illustrates an embodiment of a training set to train a virtual object placement program to assign virtual objects to positions in a user field of view.

FIGS. 5, 6a, 6b, and 6c illustrate examples of positions in a user field of view in which virtual objects may be rendered.

FIGS. 7a, and 7b illustrate an embodiment of operations to generate an assignment of virtual objects to positions in a user field of view for a virtual object request.

FIG. 9 illustrates a computing environment in which the components of FIG. 1 may be implemented.

DETAILED DESCRIPTION

Prior art systems for assigning virtual objects to positions in a user field of view may favor placement of virtual objects at positions that are easy to view, even if the virtual object content is not necessarily popular and does not receive a high level of interactions. For instance, if a virtual object is placed in a hallway of a mixed reality space that is easily viewable by the user, such placement will inherently have a high number of hits, even though the virtual object content has no or minimal relevance to the user. Similarly, a very relevant virtual object placed at a less viewable or less easy to view position will only attract a few interactions. Traditional object placement techniques will assign the low relevance virtual object a high positive reward/relevance score even though the virtual object content itself is of little relevance to the user, and the highly relevant virtual object will have a low reward/relevance value even though it is highly relevant to the user.

Described embodiments provide improved techniques for scoring positions in a mixed reality space, such as segment regions, by considering both ease of view and feedback metrics, such as number of interactions, duration of interactions, etc., to determine a reward score to assign to a virtual object. Further described embodiments may incorporate a relatedness of the content of the virtual object to other virtual objects as an interaction score to consider the total reward score for a virtual object. In this way, a less relevant virtual object positioned once at an easy to view location will not receive a high reward score if the duration and quality of interactions are low and the virtual object does not have a high interaction score indicating relatedness to other objects. Described embodiments provide an improved technique for assigning normalized reward scores to virtual objects in a mixed reality space by considering other factors than ease of viewability, which may be biased toward its previous position in the mixed reality space. The reward scores are used to assign the virtual objects to positions in the mixed reality space, comprising viewable segmentation regions in the user field of view.

Figure 1:
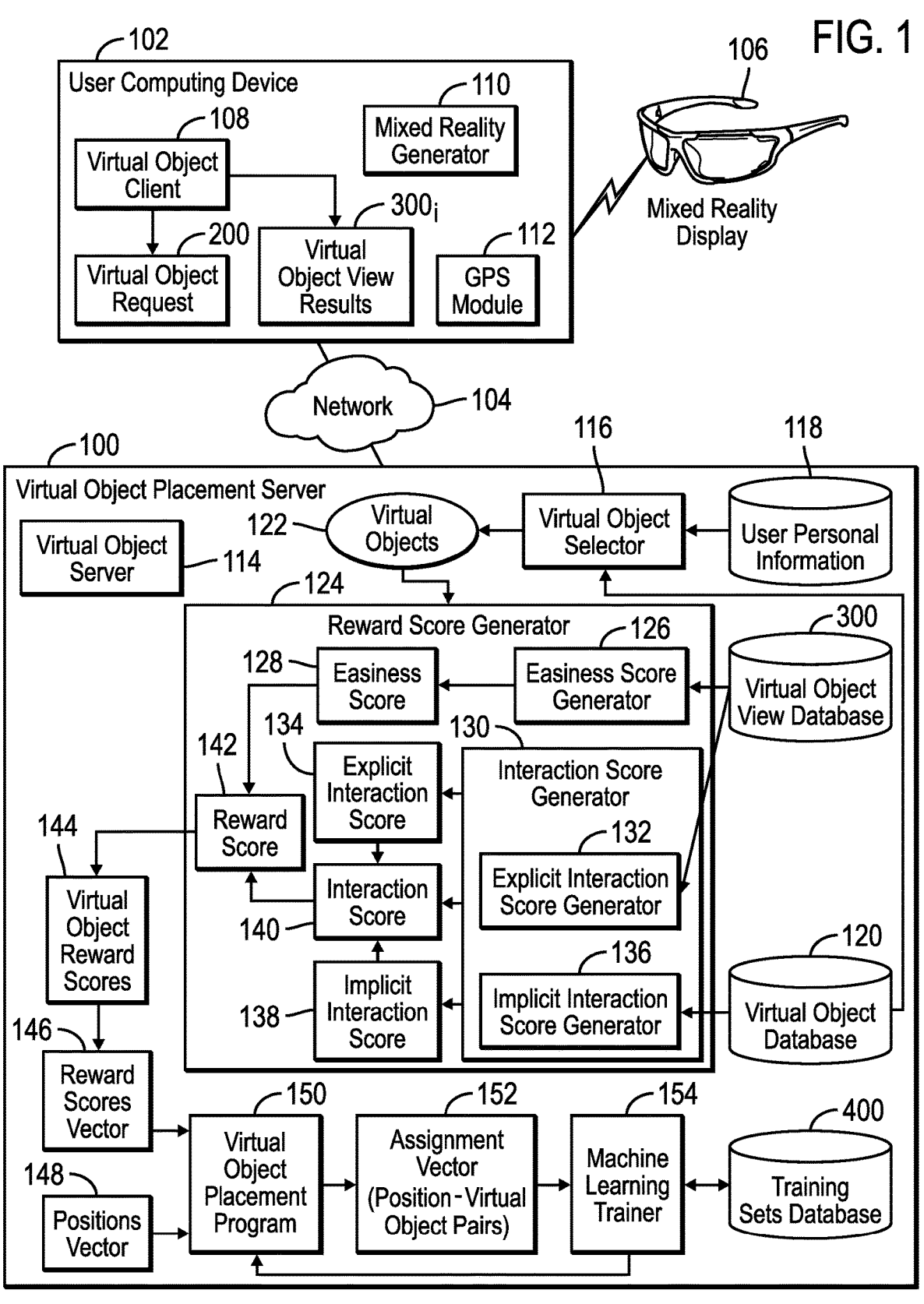
FIG. 1 illustrates an embodiment of a computing environment to control a mixed reality display to render virtual objects in a user field of view.

FIG. 1 illustrates an embodiment of a virtual object placement server 100 in communication with a user computing device 102 over a network 104. The user computing device 102 is coupled to a mixed reality display 106, e.g., mixed reality glasses, gaze tracking device, etc., such as via wireless communication methods. Alternatively, the user computing device 102 components may be implemented in the body of the mixed reality display 106. The user computing device 102 may include a virtual object client 108 to communicate a virtual object request 200 to the virtual object placement server 100 for virtual objects to render in the mixed reality display 106. The virtual object client 108 may also gather virtual object view results 300 having information on user interactions with virtual objects the display 106 renders in the field of view and forwards to the virtual object placement server 100 to store for use when calculating an ease of viewability for the interaction with the virtual objects.

The user computing device 102 includes a mixed realty generator 110 to generate mixed reality representations of virtual objects in a field of view the user is gazing through the mixed reality display 106. The user device may further include a Global Positioning Satellite (GPS) module 112 to provide position coordinates on the user's position.

In one embodiment, the mixed reality display 106 may comprise a type of computer vision glasses to render mixed reality virtual objects. The mixed reality display 106 may further comprise a gaze tracking device to receive a gazed virtual object detected by eye tracking cameras that acquire the gazed virtual object on which the tracked eye is fixed and information on coordinates of an axis of a line-of-sight, also referred to as sightline, visual axis, the user is viewing within the field of vision captured by the gaze tracking device tracking. Mixed reality (MR) smart glasses are wearable computer-capable glasses that generate virtual objects, such as three-dimensional images, text, animations, and videos, to overlay into the wearer's field of vision so the digital information is viewable along with real world scenes in the wearer's field of vision. The display 106 may further provide augmented reality (AR) virtual objects. Augmented reality is used to supplement information presented to users on items they are looking at, such as augmented reality controls to control items in the wearer's field of vision or information on locations in the field of vision. Additionally, the mixed reality glasses 106 may provide mixed reality virtual objects that interact with the real world. For instance, a mixed reality virtual object may react to you in the same way as it would in the real world, such as move closer to the user as the user moves closer to the virtual object.

The mixed reality glasses 106 include a processor, display, sensors and input devices, and may include many of the components found in smartphones and tablet computers. Mixed reality rendering may be performed by optical projection systems, monitors, handheld devices, and display systems worn on the human body. A head-mounted display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. The HMDs may also implement gesture controls for full virtual immersion.

Augmented and mixed reality reality displays may be rendered on devices resembling eyeglasses, and employ cameras to intercept real world view and re-display its augmented view through the eye pieces and devices in which MR imagery is projected through or reflected off the surfaces of the eyewear lens places. Other implementations of MR displays include a head-up display (HUD), which is a transparent display that presents data without requiring users to look away from their usual viewpoints. Mixed reality may include overlaying the information and registration and tracking between the superimposed perceptions, sensations, information, data, and images and some portion of the real world. Additional mixed reality implementations include contact lenses and virtual retinal display, where a display is scanned directly into the retina of a viewer's eye. EyeTap augmented reality devices capture rays of light that would otherwise pass through the center of the lens of the wearer's eye, and substitutes synthetic computer-controlled light for each ray of real light. The mixed reality display 106 may further use motion tracking technologies, including digital cameras and/or other optical sensors, accelerometers, GPS, gyroscopes, solid state compasses, radio-frequency identification (RFID).

The term "mixed reality" as used herein may refer to augmented reality, mixed reality, and virtual reality environments and uses.

The virtual object placement server 100 includes a virtual object server 114 to manage operations to determine virtual object placement. A virtual object selector 116 may receive as input user personal information from a user personal information database 118 having information on user demographics, object preferences, product and shopping preferences, etc., on registered users to receive virtual objects and information on virtual objects from a virtual object database 120 and determine virtual objects 122 of interest to the user submitting a virtual object request 200. The virtual object selector 116 may use machine learning to classify and order virtual objects 122 as most likely preferred by the user requesting the virtual objects. The determined or candidate virtual objects 122 are provided to a reward score generator 124 to determine reward scores for the input virtual objects 122. The reward score generator 124 includes an easiness score generator 126 to determine an easiness score 128 for a virtual object, indicating an ease of viewing the virtual object based on a user change in viewing angle to view and interact with the virtual object 122 and a depth of the virtual object 122 in the user field of vision, and a frequency of viewing the object from the virtual object view database 300. The virtual object view database 300 stores the virtual object view results 300, received from the user computing device 102.

The easiness score generator 126 may implement machine learning techniques to receive as input information on the depth of the virtual object from the user and the viewing angle from the user line of sight to the virtual object and information on interactions to generate an output easiness score. The easiness score generator 126 may be trained to output easiness scores 128 that are most likely to be an optimal easiness score given the inputs.

The reward score generator 124 further includes an interaction score generator 130 to generate an interaction score 140. The interaction score generator 130 may include an explicit interaction score generator 132 that generates an explicit interaction score 134. The explicit interaction score 134 may be based on direct user interactions with a virtual object, as indicated in the virtual object view database 300, including factors such as duration of user interaction with the virtual objects, how many interactions with the virtual object, and context of interaction, e.g., at home, office, etc.

The interaction score generator 130 may further include an implicit interaction score generator 136 to generate an implicit interaction score 138 by analyzing other virtual objects which are semantically similar based on factors such as virtual object descriptions, visual comparisons of virtual objects. In one embodiment, the implicit interaction score generator 136 may comprise a k-hop graph neural network (GNN) that builds a graph based on virtual object descriptions and comparisons between virtual objects. A virtual object graph with virtual objects represented as nodes and edges between the nodes captures the relationship between the virtual objects. The relationship is computed for each virtual object by analyzing the k-hop neighborhoods in the virtual object graph. The weight is inversely proportional to the distance while analyzing the k-hop neighbors in the virtual object graph. The implicit interaction score 138 is computed as a function of explicit interaction scores for a given nodes (virtual objects) and their k-hop neighborhoods.

The explicit interaction score 134 is combined with the implicit interaction score 138 in a function to calculate an interaction score 140. The reward score generator 124 combines the easiness score 128 and the interaction score 140 in a function to calculate an overall reward score 142 for a virtual object. Virtual object reward scores 144 for the selected virtual objects 122 are combined in a reward scores vector 146 for virtual objects 122. The reward scores vector 146 along with a positions vector 148 of positions or segmentation regions in the user field of view, having position viewability scores, are provided as input to the to a virtual object placement program 150 to output a vector of position-object pairs 152 providing an assignment of virtual objects to locations. This assignment 152 along with the virtual objects 122 are returned to the user computing device 102. The mixed reality generator 110 renders the virtual objects 122 at the assigned locations in the user field of view being viewed in the mixed reality display 106. In one embodiment, the virtual object placement program 150 may implement machine learning, and is trained to output an optimal assignment of virtual objects to viewable locations in the user field of view.

The positions indicated in the positions vector 148 in which the virtual objects are rendered may comprise segmentation regions. The mixed reality generator 110 may estimate a three-dimensional map of the user field of view by performing segmentations based on a viewability score for each of the possible segmentation region and the surrounding context details. The mixed reality generator may recompute the three dimensional map based on the user's position and the user's visual field information.

The virtual object assignment results 152 along with an assignment score providing feedback on user interactions with the virtual objects rendered at the viewable locations in the field of view are saved in a training set database 400. The machine learning trainer 154 uses the training set instances 400ᵢ to train the virtual object placement program 150 based on the user interactions with the virtual objects rendered in the assigned locations. The machine learning trainer 154 may train the virtual object placement program 150 by forming an input set, such as a matrix, of the machine learning inputs 146 and 148 for each of the virtual objects 122 and form an output set of the assignment of virtual objects to locations from the training sets 400ᵢ, such as a vector 152. The virtual object placement 150 machine learning module is then trained with the input set to produce the output set with an increased or decreased confidence level indicating a probability the output set 152 represents an optimal assignment of virtual objects to viewable locations in the user field of view.

The network 104 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the virtual object placement server 100 and the user computing device 102 represent a data flow between the components.

In certain embodiments, the virtual object placement program 150, and other components such as the virtual object selector 116, easiness score generator 126, explicit interaction score generator 132, and implicit interaction score generator 136 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the assignment vector 152 of locations to virtual objects having specified confidence levels based on the input parameters 146, 148. For instance, the inputs 146, 148 to the virtual object placement program 150 are processed to produce an assignment 152 with a confidence level. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the virtual object placement module 150, and other components 116, 126, 132, 136, margin of errors are determined based on a difference of the calculated predictions and user rankings of the output. Biases (parameters) at nodes in the hidden layer are adjusted accordingly to minimize the margin of error of the error function.

In an alternative embodiment, the virtual object placement program 150 may be implemented not as a machine learning module, but implemented using a rules based system to determine the outputs from the inputs. The virtual object placement program 150 may further be implemented using an unsupervised machine learning module, or machine learning implemented in methods other than neural networks, such as multivariable linear regression models.

Generally, program modules, such as the program components 108, 110, 112, 114, 116, 124 126, 130, 132, 136, 150, 154 may comprise routines, programs, objects, components, logic, data structures, and so on that perform particular tasks or implement particular abstract data types. The program components and hardware devices of the systems 100 and 102 of FIG. 1 may be implemented in one or more computer systems, where if they are implemented in multiple computer systems, then the computer systems may communicate over a network.

The program components 108, 110, 112, 114, 116, 124 126, 130, 132, 136, 150, 154 may be accessed by a processor from memory to execute. Alternatively, some or all of the program components 108, 110, 112, 114, 116, 124 126, 130, 132, 136, 150, 154 may be implemented in separate hardware devices, such as Application Specific Integrated Circuit (ASIC) hardware devices.

The functions described as performed by the program 108, 110, 112, 114, 116, 124 126, 130, 132, 136, 150, 154 may be implemented as program code in fewer program modules than shown or implemented as program code throughout a greater number of program modules than shown.

The program components described as implemented in the server 100 may be implemented in the user computing device 102.

The user computing device 102 may comprise a personal computing device, such as a laptop, desktop computer, tablet, smartphone, wearable computer, etc. The server 100 may comprise one or more server class computing devices, or other suitable computing devices. Alternatively, the user computing device 102 may be embedded in the mixed reality display 106.

FIG. 2 illustrates an embodiment of a virtual object request 200 generated by the virtual object client 108 to request virtual objects to render at positions, segmentation regions, in the user field of view through the display 106, and may include: a user identifier (ID) 202; location information 204 on the user location, such as location type, GPS coordinates determined by GPS module 112, and context of use, e.g., during work hours, at home, vacation, at a public event, etc.; a field of view 206 comprising coordinates of a field of view of the user; and positions 208 comprising coordinates in the field of view 206, such as not blocked by real world objects, at which virtual objects may be rendered; and position viewability scores 210 of the positions 206 indicating an ease of view of the positions 208 based on their depth from the user and angle of viewing from the user line of sight, and size of the position, i.e., segmentation region.

FIG. 3 illustrates an embodiment of object view results 300$_i$ sent from the virtual object client 108 to the virtual object placement sever 100 in response to a detected user interaction with the virtual object rendered in the display 106, and may include: a user ID 302 identifying the user that interacted with the virtual object; location information 304 comprising information on the location at which the user interacted with the virtual object, such as location type, e.g., office, home, public event, etc., coordinates of location, and context, e.g., time of day, user emotions, etc.; a virtual object ID 306 of the virtual object with which the user interacted; viewing information 308, such as depth from user, change in viewing angle by user to view the virtual object 306, and coordinates; and interaction information 310, such as type of interaction, if any, e.g., clicking, touching, etc., duration of interaction, context of interaction.

FIG. 4 illustrates an embodiment of a training set instance 400$_i$ that may include: a user ID 402 for which the virtual objects are requested; a user location 404 at which the virtual objects are rendered by the mixed reality glasses 106; a reward scores vector 406 and positions vector 408 that were inputted to the virtual object placement program 150 to produce as output the vector assignments 410 with a confidence level 412; and interactions 414 with the virtual objects when rendered in the positions indicated in the positions vector 408 in the mixed reality display 106.

FIG. 5 illustrates an embodiment of positions (segmentation regions), e.g., 502, 504 in a frontier of the user 506, including positions in the field of view of the user 506, e.g., 508, 510. In FIG. 5, the positions, including the space they consume in which virtual objects may be placed, are shown a black spheres.

FIG. 6a illustrates a frontier 600 of the user including a current field of view 602 based on the eye position. If the user 604 changes their viewing angle, then the field of view would change, thus allowing the user to view and interact with different virtual objects.

FIGS. 6b and 6c show virtual objects A, E, F in the field of view 602 of the user 604 when the user is viewing the field of view 602 from different angles. Virtual object E consumes the largest space of the field of view 602, and thus will be easier to view than virtual objects E and F that consume a smaller space and are a greater depth from the user.

FIGS. 7a and 7b illustrate an embodiment of operations performed by components in the virtual object placement server 100 to process a virtual object request 200 from a virtual object client 108 for virtual objects to render in the mixed reality display 106. Upon the virtual object server 114 receiving (at block 700) the virtual object request 200 having positions 208 with viewability scores in which virtual objects are to be populated, the virtual object selector 116 processes (at block 702) user personal information (demographics, preferences, etc.) in the user personal information database 118 and metadata for virtual objects in the virtual object database 120 to determine virtual objects 122 of relevance to the user submitting the virtual object request 200. The determined virtual objects 122 may comprise the same number as the number of positions 208 in the user field of view 602 or frontier 600 (FIG. 6) to fill with virtual objects.

For each determined virtual object i, a loop of operations at blocks 704 through block 716 are performed. At block 706, the easiness score generator 126 determines an easiness score 128 for virtual object i as a function of a sum of, for each previous interaction with virtual object i, a weight, based on a depth of user from virtual object i and a change in viewing angle, times a position area in which the virtual object i was rendered as divided by a number of view of virtual object i. Equation (1) below provides an embodiment for determining the easiness score 128:

(1)

$$\text{Easiness Score } (VO_i) = \frac{1}{1 + \log(n)} * \frac{1}{n} * \sum_{j=1}^{n} (w_j * R_j),$$

where n is number of views of a virtual object i (VO$_i$), w$_j$ is a weight for one viewing j of virtual object i, and R$_j$ is the volume of a region of a position in which the viewed virtual object i was placed when viewed during viewing instance j. The variables on different viewings 300$_j$ of virtual object i are maintained in the virtual object database 300.

The weight w$_j$ in Equation (1) may be calculated according to Equation (2) below:

$$w_j = \delta * \nabla\theta + (1-\delta) * \partial,\tag{2}$$

where $\delta$ is a weight given to viewing angle penalty, $\nabla\theta$ represents the change in the viewing angle, and $\partial$ represents the depth from the user. These variables may be obtained from object view results 300$_j$ from different viewings of virtual object i. The viewings j from which the easiness score 128 is calculated may be from just the user 202 initiating the request 200 or may be from multiple users to crowd source the viewings used to calculate the easiness score 128.

The easiness to view the virtual object i is defined by the size of the segmentation region (R$_j$) and the viewing angle. This easiness score 128 is calculated from multiple viewings of the virtual object j, so the frequency or number of views (n) is used to balance the easiness and provide an average of the easiness calculation across number of views.

The explicit interaction score generator 132 calculates (at block 708) the explicit interaction score 134 as a function of user interactions with virtual object i, including the duration of interaction, the number of interactions, and the context of interactions (e.g., location, time of day, etc.). The implicit interaction score generator 136 calculates (at block 710) an implicit interaction score 138 based on relationships of the virtual object with other virtual object i, e.g., by analyzing k-hop neighborhood in a graph of virtual objects having edges that capture relationship among virtual objects. The interactions used to calculate the explicit 134 and implicit 138 interaction scores may be from the user 202 initiating the request 200 or from a plurality of users to crowd source the data used to determine the interaction score 140. The reward score generator 124 may combine (at block 712) the explicit 134 and implicit 138 interaction scores into an interaction score 140. Equation (3) below provides an embodiment to calculate the combined interaction score 140 for virtual object i (VO$_i$).

$$\text{Interaction}^{score}(\text{VO}i) = w_{explicit} \cdot \text{Explicit}(\text{VO}i) + w_{implicit} \cdot \text{Implicit}(\text{VO}i), \qquad (3)$$

where $w_{explicit}$ and $w_{implicit}$ are predefined weights to weight the explicit 134 and implicit 138 interaction scores, where the weights may add up to one.

The reward score generator 124 may then combine (at block 714) the interaction score 140 with the easiness score 128 to determine a total reward score 142 for virtual object i. Equation (4) below provides an embodiment to calculate the final reward score 142 for a virtual object i (VO$_i$).

$$\text{Reward}^{score}(\text{VO}_i) = w_{easiness}(\text{VO}_i) \cdot \text{Easiness}(\text{VO}_i) + w_{interaction}(\text{VO}_i) \cdot \text{Interaction}(\text{VO}_i), \qquad (4)$$

where the easiness score 128 and interaction score 140 are weighted by weights $w_{easiness}$ and $w_{interaction}$, respectively, that sum to one.

After calculating the reward score 142 for each of the virtual objects 122 to include in positions 208, control proceeds (at block 718) to block 720 in FIG. 7b With respect to FIG. 7b, the virtual object server 114 forms (at block 720) a reward score vector 146, having reward scores (RS$_i$) 144 for each of the processed virtual objects (VO$_i$) 122, and forms (at block 722) a positions vector 148, having positions and viewability scores for the positions, as supplied in field 208 of the virtual object request 208, for the positions in the field of view. The virtual object server 114 inputs (at block 724) the reward scores vector 146 and positions vector 148 to the virtual object placement program 150 to output an assignment 152 of the virtual objects for which reward scores 146 are provided to positions indicated in the positions vector 148. The virtual object server 144 transmits (at block 726) a response to the virtual object request 200 including the virtual objects 122 and the assignment 152 of the virtual objects to positions to cause the mixed reality generator 110 to render in the mixed reality display 106 the virtual objects 122 in the assigned positions/segmentation regions. A mentioned the positions/ segmentations regions were previously determined by the mixed reality generator 110 based on the user field of view.

The virtual object server 114 may further generate (at block 728) a training set instance 400$_i$ having the user ID 402 of the user 202 that initiated the virtual object request 200; the user location information 404 having the location information 204 from the virtual object request 200; the input reward scores vector 406 including the generated reward scores vector 146; the input positions vector 408 including the generated position in the positions vector 148; the output assignment vector 410 including the assignment vector 152 of position and virtual object pairs; a confidence level 412 indicating a probability the assignment 410 provides an optimal assignment, that minimizes the cost function, for the inputs 406, 408; and interactions 414 indicating user interactions, e.g., views, clicks, manipulation, of the user with the rendered virtual objects 122 in the display 106. The interactions 414 may comprise the number and type of interactions indicated in object view results 300$_i$ for all the virtual objects in the assignment 410. The virtual object server 114 may update (at block 730) the interactions field 414 in the training set 400$_i$ to indicate interactions with the virtual objects indicated in the training set. The interactions may be determined from virtual object view results 300$_i$ from the virtual object client 108 for interactions with virtual objects in the assigned 410 positions indicated in the training set 400$_i$. The training set 400$_i$ is saved (at block 732) in the training set database 400 for subsequent use to train the virtual object placement program 150.

With the embodiment of FIGS. 7a, 7b, reward scores for virtual object candidates to return to a virtual object client for rendering in a mixed reality display 106 are determined based on an easiness of viewing the virtual objects across multiple viewing instances and interactions with the virtual objects, including explicit interactions and implicit interactions based on relatedness to other viewing objects. These scores are then inputted to a virtual object placement program to determine an optimal assignment of virtual objects to positions in a user field of view based on a viewability score of the positions. The described embodiments tend to place virtual objects with a higher reward score in more desirable positions to view.

Figure 8:
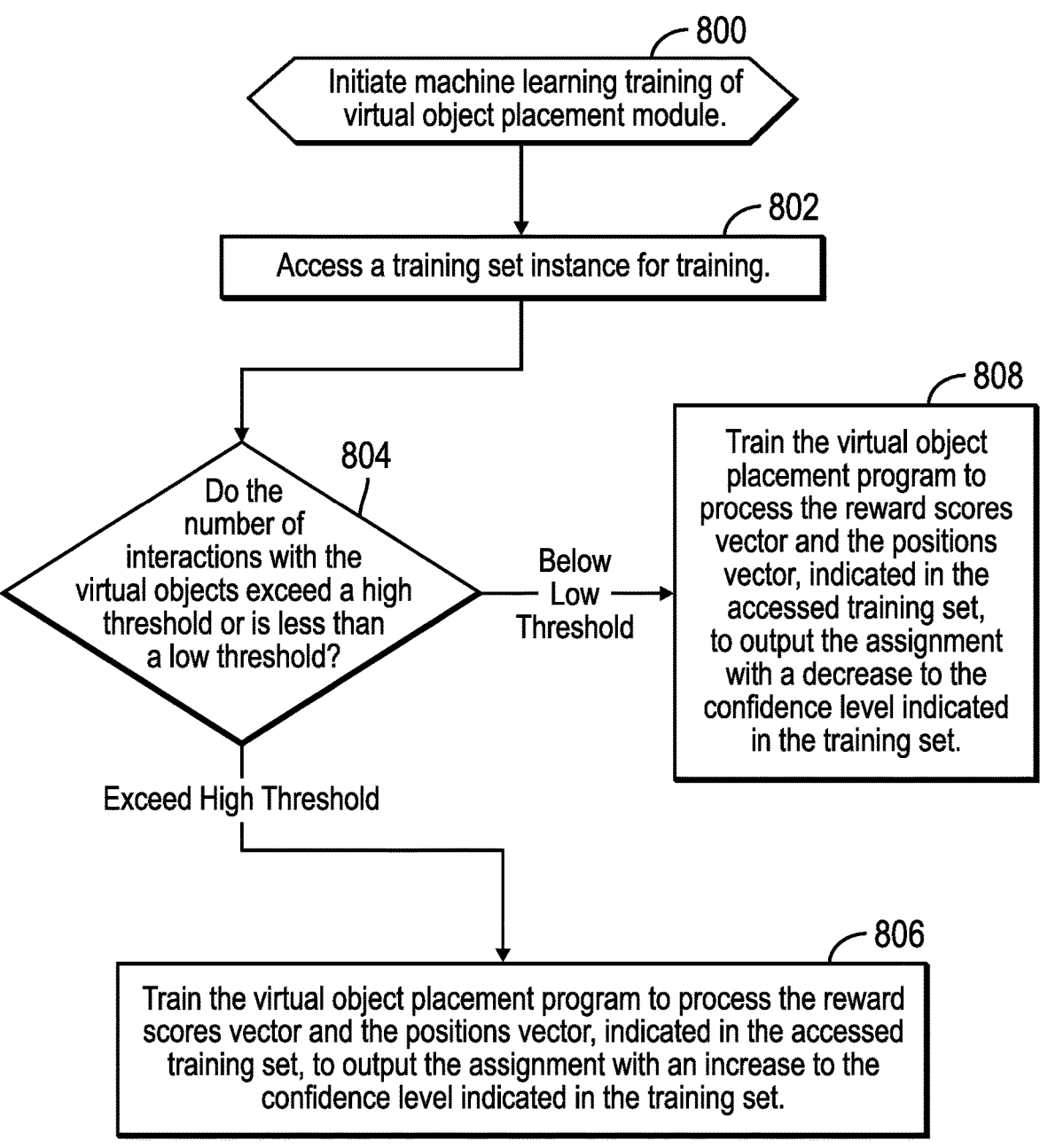
FIG. 8 illustrates an embodiment of machine learning training of a virtual object placement program to generate assignments of virtual objects to positions in a user field of view.

FIG. 8 illustrates an embodiment of operations performed by the machine learning trainer 154 to train the virtual object placement program 150 with training sets 400$_i$ from the training set database 400 to output an assignment of virtual objects to segment locations at which to render the virtual objects. Upon initiating (at block 800) machine learning operations of the virtual object placement program 150, the machine learning trainer 154 accesses (at block 802) a training set instance 400$_i$. If (at block 804) the number of interactions 414 with the virtual objects in the assignment 410 exceed a high threshold, indicating the assignment 410 received a relatively high number or frequency of views and interactions 414 in the user field of view, then the machine learning trainer 154 trains (at block 806) the virtual object placement program 150 to process the reward scores vector 406 and the positions vector 408, indicated in the accessed training set 400$_i$, to output the assignment 410 with an increase to the confidence level 412 indicated in the training set. If (at block 804) the number of interactions 414 are below a low threshold, indicating a low number or frequency of interactions with the virtual objects in the assignment 410, then the machine learning trainer 154 trains (at block 808) the virtual object placement program 150 to process the reward scores vector 406 and the positions vector 408, indicated in the accessed training set 400$_i$, to output the assignment vector 410 with a decrease to the confidence level 412 indicated in the training set 400$_i$.

With the embodiment of FIG. 8, the machine learning trainer 154 trains the virtual object placement program 150 to output the assignment vector 410 in a training set 400$_i$ based on the input vectors 406, 408 to increase or decrease the confidence level 412 of the original assignment vector 410 based on the interaction level with the assignment of virtual objects to locations segments in the user field of view. In this way, the virtual object placement program 150 is trained to output assignment vectors that receive a high level of interactions with a relatively higher confidence level and output assignment vectors receiving lackluster interaction levels with a relatively lower confidence level. This training regime increases the likelihood the virtual object placement program 150 assigns virtual objects to segmentation regions in an optimal manner that increases amount of user inter- action.

In one embodiment, the interactions 414 for an assign- ment of virtual objects to positions may be based on interactions from just one user. However, in alternative embodiments, to the extent there are similar assignment 410s for the same virtual objects, then interactions from different users for those similar assignments may also be counted to crowd source determination of level of interactions with a particular assignment of virtual objects to segment locations in a user field of view.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code 901 involved in performing the inventive methods, such as virtual object placement server components 903, including programs 114, 116, 124, 126, 130, 132, 136, 150, and 154, and virtual object placement client components 905, including programs 108, 110, and 112 (FIG. 10).

In addition to block 901, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 901, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 901 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining virtual objects to render in a mixed reality display, the computer program product comprising a computer readable storage medium having computer readable program code embodied therein that is executable to perform operations, the operations comprising:

providing viewability scores for positions in a field of view of a user in which virtual objects are rendered, wherein a viewability score for a position is based on a distance from the user and change in viewing angle to view the position;

calculating reward scores for virtual objects, wherein a reward score for a virtual object is calculated based on an easiness score indicating an easiness to view the virtual object in previous interactions with the virtual object and frequency of interactions with the virtual object;

inputting the reward scores and the viewability scores for the positions into a virtual object placement program to output an assignment of the virtual objects to the positions; and transmitting the assignment of the virtual objects to the positions to the mixed reality display to cause the mixed reality display to render the virtual objects at the positions in the field of view of the user indicated in the assignment.

2. The computer program product of claim 1, wherein the virtual object placement program implements machine learning, wherein the operations further comprise:

receiving feedback indicating interactions with the virtual objects rendered at the positions according to the assignment, wherein the virtual object placement program outputted the assignment with a confidence level indicating a probability that the assignment is optimal;

determining whether the interactions satisfy a positive threshold indicating a high level of interactions with the virtual objects in the positions indicated in the assignment or a low threshold indicating a low level of interactions with the virtual objects in the positions indicated in the assignment;

training the virtual object placement program to receive as input the reward scores for the virtual objects and the viewability scores for the positions and output the assignment of the virtual objects to the positions with an increased confidence level comprising an increase to the confidence level in response to determining that the interactions satisfy the positive threshold; and training the virtual object placement program to receive as input the reward scores for the virtual objects and the viewability scores for the positions and output the assignment of the virtual objects to the positions with a decreased confidence level comprising a decrease to the confidence level in response to determining that the interactions do not satisfy the positive threshold.

3. The computer program product of claim 1, wherein the easiness to view a virtual object is a function of a sum of a weight based on a depth of the user from the virtual object and a change in a viewing angle by the user to view the virtual object in the field of view times a size of the virtual object in the field of view for previous interactions with the virtual object.

4. The computer program product of claim 1, wherein calculating a reward score for a virtual object further comprises:

calculating an interaction score based on user previous interactions with the virtual object, wherein the reward score is a function of the easiness score and the interaction score.

5. The computer program product of claim 4, wherein calculating the interaction score for the virtual object further comprises calculating an implicit interaction score based on relationships of the virtual object with other virtual objects, wherein the interaction score is a function of user previous interactions with the virtual object and the implicit interaction score.

6. The computer program product of claim 5, wherein the implicit interaction score is calculated from a graph of nodes representing virtual objects and edges between the nodes that captures a relationship of the virtual objects at the nodes on the edges.

7. The computer program product of claim 1, wherein the operations further comprise:

processing personal information on the user to compare to metadata on a database of virtual objects to determine virtual objects relevant to the user, wherein the reward scores are calculated for the virtual objects relevant to the user, and wherein the virtual objects assigned to the positions comprise the virtual objects relevant to the user.

8. The computer program product of claim 1, wherein the operations further comprise:

receiving, from the mixed reality display, information on a user interaction with a virtual object rendered in the field of view including an identifier of the virtual object, a distance of the user from the virtual object in the field of view, and a change in viewing angle for the user to view and interact with the virtual object; and storing the information on the user interaction with the virtual object to later use to determine the easiness score indicating an easiness to view the virtual object and frequency of interactions with the virtual object.

9. A system for determining virtual objects to render in a mixed reality display, comprising:

a processor; and a computer readable storage medium having computer readable program code embodied therein that when executed by the processor performs operations, the operations comprising:

providing viewability scores for positions in a field of view of a user in which virtual objects are rendered, wherein a viewability score for a position is based on a distance from the user and change in viewing angle to view the position;

calculating reward scores for virtual objects, wherein a reward score for a virtual object is calculated based on an easiness score indicating an easiness to view the virtual object in previous interactions with the virtual object and frequency of interactions with the virtual object;

inputting the reward scores and the viewability scores for the positions into a virtual object placement program to output an assignment of the virtual objects to the positions; and transmitting the assignment of the virtual objects to the positions to the mixed reality display to cause the mixed reality display to render the virtual objects at the positions in the field of view of the user indicated in the assignment.

10. The system of claim 9, wherein the virtual object placement program implements machine learning, wherein the operations further comprise:

receiving feedback indicating interactions with the virtual objects rendered at the positions according to the assignment, wherein the virtual object placement program outputted the assignment with a confidence level indicating a probability that the assignment is optimal;

determining whether the interactions satisfy a positive threshold indicating a high level of interactions with the virtual objects in the positions indicated in the assignment or a low threshold indicating a low level of interactions with the virtual objects in the positions indicated in the assignment;

training the virtual object placement program to receive as input the reward scores for the virtual objects and the viewability scores for the positions and output the assignment of the virtual objects to the positions with an increased confidence level comprising an increase to the confidence level in response to determining that the interactions satisfy the positive threshold; and training the virtual object placement program to receive as input the reward scores for the virtual objects and the viewability scores for the positions and output the assignment of the virtual objects to the positions with a decreased confidence level comprising a decrease to the confidence level in response to determining that the interactions do not satisfy the positive threshold.

11. The system of claim 9, wherein calculating a reward score for a virtual object further comprises:

calculating an interaction score based on user previous interactions with the virtual object, wherein the reward score is a function of the easiness score and the interaction score.

12. The system of claim 11, wherein calculating the interaction score for the virtual object further comprises calculating an implicit interaction score based on relationships of the virtual object with other virtual objects, wherein the interaction score is a function of user previous interactions with the virtual object and the implicit interaction score.

13. The system of claim 12, wherein the implicit interaction score is calculated from a graph of nodes representing virtual objects and edges between the nodes that captures a relationship of the virtual objects at the nodes on the edges.

14. The system of claim 11, wherein the operations further comprise:

processing personal information on the user to compare to metadata on a database of virtual objects to determine virtual objects relevant to the user, wherein the reward scores are calculated for the virtual objects relevant to the user, and wherein the virtual objects assigned to the positions comprise the virtual objects relevant to the user.

15. The system of claim 11, wherein the operations further comprise:

receiving, from the mixed reality display, information on a user interaction with a virtual object rendered in the field of view including an identifier of the virtual object, a distance of the user from the virtual object in the field of view, and a change in viewing angle for the user to view and interact with the virtual object; and storing the information on the user interaction with the virtual object to later use to determine the easiness score indicating an easiness to view the virtual object and frequency of interactions with the virtual object.

16. A method for determining virtual objects to render in a mixed reality display, comprising:

providing viewability scores for positions in a field of view of a user in which virtual objects are rendered, wherein a viewability score for a position is based on a distance from the user and change in viewing angle to view the position;

calculating reward scores for virtual objects, wherein a reward score for a virtual object is calculated based on an easiness score indicating an easiness to view the virtual object in previous interactions with the virtual object and frequency of interactions with the virtual object;

inputting the reward scores and the viewability scores for the positions into a virtual object placement program to output an assignment of the virtual objects to the positions; and transmitting the assignment of the virtual objects to the positions to the mixed reality display to cause the mixed reality display to render the virtual objects at the positions in the field of view of the user indicated in the assignment.

17. The method of claim 16, wherein the virtual object placement program implements machine learning, further comprising:

receiving feedback indicating interactions with the virtual objects rendered at the positions according to the assignment, wherein the virtual object placement program outputted the assignment with a confidence level indicating a probability that the assignment is optimal;

determining whether the interactions satisfy a positive threshold indicating a high level of interactions with the virtual objects in the positions indicated in the assignment or a low threshold indicating a low level of interactions with the virtual objects in the positions indicated in the assignment;

training the virtual object placement program to receive as input the reward scores for the virtual objects and the viewability scores for the positions and output the assignment of the virtual objects to the positions with an increased confidence level comprising an increase to the confidence level in response to determining that the interactions satisfy the positive threshold; and training the virtual object placement program to receive as input the reward scores for the virtual objects and the viewability scores for the positions and output the assignment of the virtual objects to the positions with a decreased confidence level comprising a decrease to the confidence level in response to determining that the interactions do not satisfy the positive threshold.

18. The method of claim 16, wherein calculating a reward score for a virtual object further comprises:

calculating an interaction score based on user previous interactions with the virtual object, wherein the reward score is a function of the easiness score and the interaction score.

19. The method of claim 18, wherein calculating the interaction score for the virtual object further comprises calculating an implicit interaction score based on relationships of the virtual object with other virtual objects, wherein the interaction score is a function of user previous interactions with the virtual object and the implicit interaction score.

20. The method of claim 16, further comprising:

receiving, from the mixed reality display, information on a user interaction with a virtual object rendered in the field of view including an identifier of the virtual object, a distance of the user from the virtual object in the field of view, and a change in viewing angle for the user to view and interact with the virtual object; and storing the information on the user interaction with the virtual object to later use to determine the easiness score indicating an easiness to view the virtual object and frequency of interactions with the virtual object.

* * * * *